(12) United States Patent
Schwai et al.

(10) Patent No.: US 12,509,301 B2
(45) Date of Patent: Dec. 30, 2025

(54) CONVEYOR SYSTEM FOR SELECTIVELY DIVERTING OBJECTS

(71) Applicant: Laitram, L.L.C., Harahan, LA (US)

(72) Inventors: Jeffrey S. Schwai, Walkersville, MD (US); Joseph F. Kovacs, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 64 days.

(21) Appl. No.: 18/699,665

(22) PCT Filed: Sep. 21, 2022

(86) PCT No.: PCT/US2022/044216
§ 371 (c)(1),
(2) Date: Apr. 9, 2024

(87) PCT Pub. No.: WO2023/064072
PCT Pub. Date: Apr. 20, 2023

(65) Prior Publication Data
US 2024/0425287 A1    Dec. 26, 2024

Related U.S. Application Data

(60) Provisional application No. 63/255,548, filed on Oct. 14, 2021.

(51) Int. Cl.
*B65G 17/24* (2006.01)
*B65G 47/53* (2006.01)

(52) U.S. Cl.
CPC .............. *B65G 17/24* (2013.01); *B65G 47/53* (2013.01)

(58) Field of Classification Search
CPC ......... B65G 47/53; B65G 47/54; B65G 17/24
(Continued)

(56) References Cited

U.S. PATENT DOCUMENTS 5,921,374 A     7/1999  Takino et al.
6,968,941 B2 *  11/2005 Fourney ................ B65G 17/08
                                                198/779

(Continued)

FOREIGN PATENT DOCUMENTS

CN       110015535 A     7/2019
CN       111332679 A     6/2020
(Continued)

OTHER PUBLICATIONS

Extended European Search Report, European Patent Application No. 22881545.2, mailed Sep. 18, 2025, European Patent Office, Munich, Germany.

*Primary Examiner* — Mark A Deuble
(74) *Attorney, Agent, or Firm* — Catherine M. Bishop (57) ABSTRACT

A conveyor system includes a conveyor belt having a plurality of article-diverting conveyor belt rollers. An underlying drive roller assembly includes a plurality of pivotable rollers carriers, each having a freely rotatable drive roller that contacts the conveyor belt rollers from below. An actuator moves a movable orientation plate along an arc-shaped path to pivot the carriers and change the orientation of the drive rollers. The drive rollers may also move into and out of engagement with the conveyor belt rollers as their orientation changes. The movable orientation plate is sandwiched between upper and lower support plates to adjust the orientation of the drive rollers relative to the belt rollers.

15 Claims, 6 Drawing Sheets

(58) Field of Classification Search
USPC .................................. 198/779, 370.03, 370.1
See application file for complete search history.

(56) References Cited

U.S. PATENT DOCUMENTS

| | | | |
|---|---|---|---|
| 8,225,922 B1* | 7/2012 | Fourney | B65G 17/24 198/779 |
| 9,073,704 B2* | 7/2015 | Fourney | B65G 39/20 |
| 9,079,717 B1* | 7/2015 | Costanzo | B65G 39/025 |
| 9,428,338 B2* | 8/2016 | Ragan | B65G 13/06 |
| 10,543,986 B1 | 1/2020 | Sines | |
| 12,091,255 B2* | 9/2024 | Fourney | B65G 47/642 |
| 2009/0173598 A1 | 7/2009 | Fourney | |
| 2011/0022221 A1* | 1/2011 | Fourney | B65G 17/24 198/370.09 |
| 2022/0185596 A1* | 6/2022 | Fourney | B65G 47/53 |

FOREIGN PATENT DOCUMENTS

| | | | |
|---|---|---|---|
| CN | 112207043 A | 1/2021 | |
| CN | 113697363 A | 11/2021 | |
| KR | 101615854 B1 | 4/2016 | |

* cited by examiner

CONVEYOR SYSTEM FOR SELECTIVELY DIVERTING OBJECTS

RELATED APPLICATIONS

This application claims priority to U.S. Provisional Patent Application Ser. No. 63/255,548, filed Oct. 14, 2021, and entitled "Conveyor System for Selectively Diverting Objects", the contents of which are herein incorporated by reference.

BACKGROUND

The invention relates generally to power-driven conveyors and, more particularly, to conveyor systems having conveyor belts with object-supporting rollers rotated by contact with a drive mechanism having freely rotatable drive rollers whose orientations are changeable to cause the object-supporting rollers to rotate in one direction or another.

It is often necessary to divert objects from a conveyor belt, for example to another conveyor belt, for purposes of routing or positioning the objects for processing of one type or another.

U.S. Pat. No. 7,506,751, Mar. 24, 2009, to Matthew L. Fourney describes a conveyor system for diverting objects carried atop a conveyor belt having object-supporting rollers. As the conveyor belt advances in a direction of belt travel, the belt rollers ride on freely rotatable drive rollers supporting the conveyor belt from below. The belt rollers are arranged in lanes and rotate on axes parallel to the direction of belt travel. The drive rollers are mounted in pivotable cartridges. An actuator coupled to the cartridges pivots the cartridges and the drive rollers in place and into contact with the belt rollers. When the drive rollers are pivoted to oblique angles relative to the conveyor belt rollers, the belt rollers are rotated to direct conveyed objects toward one side of the conveyor belt or the other depending on the angle of the drive roller relative to the direction of belt travel.

SUMMARY

One version of a conveyor system embodying features of the invention a conveyor belt having a plurality of conveyor belt rollers configured to divert objects atop the rollers as the belt advances and a drive roller assembly. The drive roller assembly includes drive rollers for selectively engaging and activating the conveyor belt rollers and a movable orientation plate that moves through an arc-shaped path for moving the drive rollers into and out of an engaged position.

According to a first aspect, a drive roller assembly includes a plurality of pivotable roller carriers, an upper support plate, a lower support plate and a movable orientation plate sandwiched between the upper support plate and lower support plate. The drive roller assembly selectively actuates conveyor belt rollers in a conveyor belt configured to divert objects atop the conveyor belt rollers as the conveyor belt advances along a carryway. Each roller carrier houses a freely rotatable drive roller that contacts the conveyor belt rollers from below the conveyor belt and has a pin extending downwards that is offset from a vertical axis of the roller carrier. The upper support plate includes a planar portion and an array of openings for seating the pivotable roller carriers. Each pin extends through the upper support plate. The lower support plate has a planar portion coupled to and spaced from the planar portion of the upper support plate. The movable orientation plate engages the pivotable roller carriers to change the orientation of the drive rollers with respect to the conveyor belt rollers. The movable orientation plate includes pivot openings for receiving the pins. An actuator selectively moves the movable orientation plate through an arc-shaped path to pivot the pivotable roller carriers about their vertical axes.

According to another aspect, a roller carrier for housing a drive roller comprises a cylindrical housing with an opening for the drive roller and a pin extending down from the bottom of the cylindrical housing. The pin is offset from a vertical axis of the roller carrier.

According to another aspect, a movable orientation plate for activating a drive roller in a drive roller assembly comprises a planar substrate, a plurality of pivot openings for receiving offset pins from a drive roller carrier and a plurality of arc-shaped clearance slots for allowing passage of a first set of protrusions connecting an upper support plate to a lower support plate of the drive roller assembly. The movable orientation plate is sandwiched between the upper support plate and the lower support plate.

BRIEF DESCRIPTION OF THE DRAWINGS

The disclosed systems and methods can be understood with reference to the following drawings. The components in the drawings are not necessarily to scale.

DETAILED DESCRIPTION

Existing conveyor systems that include conveyor belt rollers, although providing advantages over previous systems, still have limitations.

Figure 1:
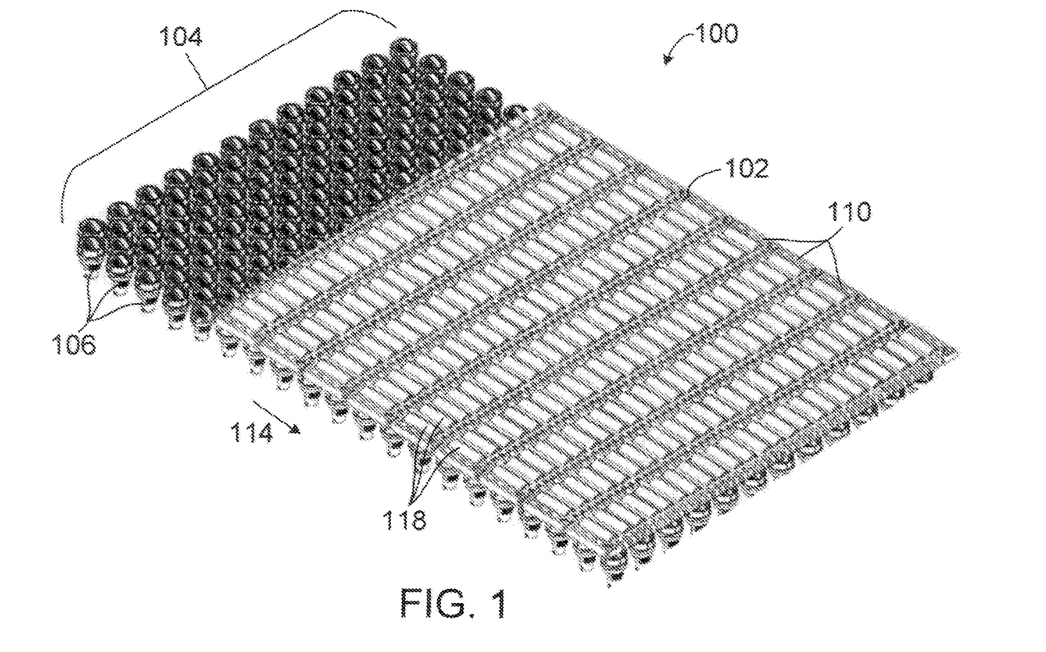
FIG. 1 is an isometric view of a portion of a conveyor system that can be adjusted to divert objects at various angles to either side of the system according to an embodiment.
Figure 2:
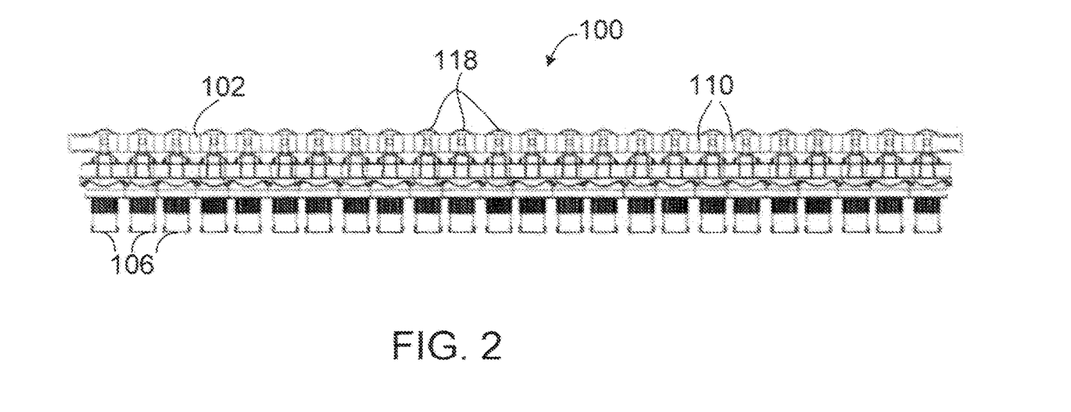
FIG. 2 is a side view of the portion of FIG. 1.

Referring to the Figures, in which like numerals indicate corresponding parts throughout the several views, FIGS. 1 and 2 illustrate an embodiment of a portion of a conveyor system 100 that can be adjusted to divert objects at various angles to either side of the system. As indicated in FIGS. 1 and 2, the conveyor system 100 comprises a roller conveyor belt 102 and a field 104 of angularly adjustable "drive" roller modules 106 below the conveyor belt. In the embodiment of FIGS. 1 and 2, the conveyor belt 102 comprises a plurality of hingedly-connected transverse modular conveyor belt modules 110. The belt is constructed of a series of rows of one or more belt modules connected side to side and end to end at hinge joints into an endless belt loop advancing along a portion of a conveyor carryway in a direction of belt travel 114. The conveyor belt is reversible and may travel in an opposite longitudinal direction from direction 114.

One or more of the conveyor belt modules 110 includes free-spinning conveyor belt rollers 118 for selectively supporting and—or diverting object carried by the conveyor belt 102. The conveyor belt rollers 118 can be mounted on axles and extend longitudinally in the direction of belt travel 114 to enable the conveyor belt rollers 118 to selectively divert objects to either side of the conveyor belt. For the purposes of this disclosure, the term "free-spinning" means that the rollers are free to spin about their axes of rotation in either angular direction. Therefore, the rollers 118 may be said to comprise "idler" rollers that will freely rotate in either angular direction when driven by an appropriate force. In the embodiment of FIGS. 1 and 2, the conveyor belt rollers 118 are positioned such that their axes of rotation are parallel to the direction of belt travel 114. The conveyor belt rollers 118 can be alternately provided in another orientation. In another embodiment, the conveyor belt rollers 118 can be replaced with roller assemblies comprising multiple rollers that actuate each other and extend through the height of the conveyor belt 102.

The drive roller modules 106 below the conveyor belt selectively engage the conveyor belt rollers 118 to actuate the belt rollers to selectively effect diversion of objects on the conveyor belt. When non-actuated, the conveyor belt rollers 118 support and carry objects on the conveyor belt in the direction of belt travel 114 without spinning.

The conveyor belt rollers 118 are made of metal and/or plastic or another suitable material and may be provided with a rubber or plastic high-friction outer layer or coating that prevents slippage when rollers of the drive roller modules 106 are brought into contact with the conveyor belt rollers 118. The conveyor belt rollers 118 are dimensioned so as to extend beyond the upper and lower surfaces of the conveyor belt 102 (and belt module bodies) such that they can both divert objects placed on the conveyor belt 102 and can be selectively driven from below by the drive roller modules 106, though the invention is not limited.

Figure 3:
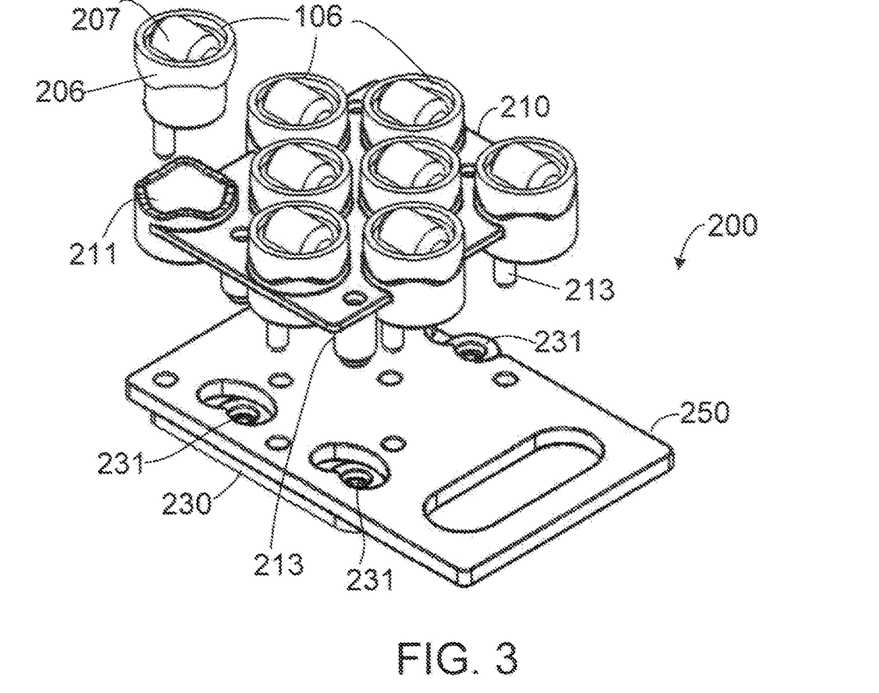
FIG. 3 is an exploded view of an activation assembly for selectively activating conveyor belt rollers in a first position.
Figure 4:
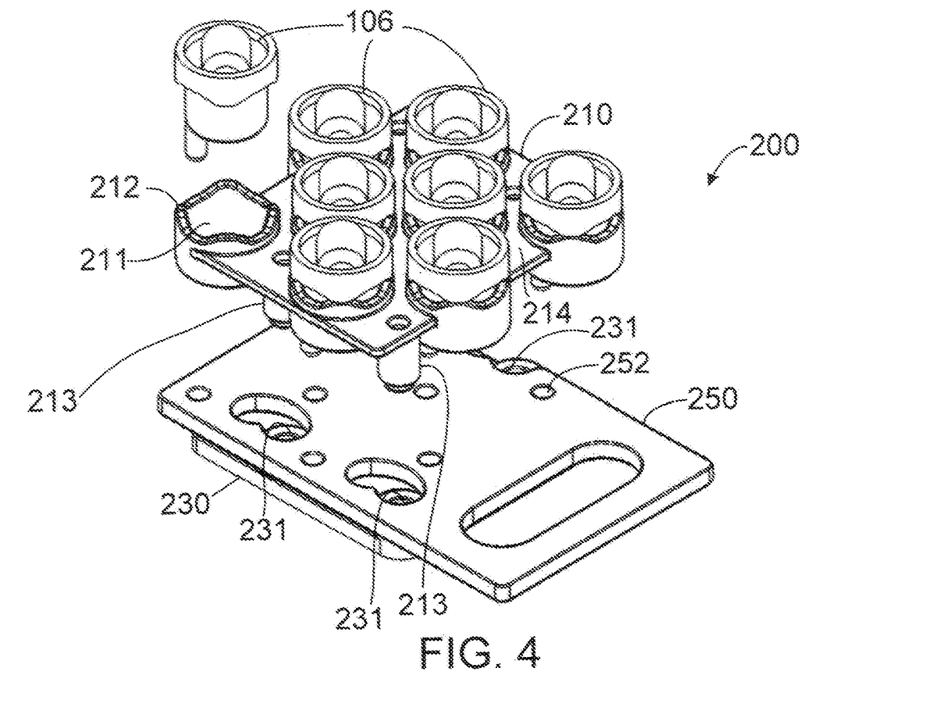
FIG. 4 shows the exploded activation assembly of FIG. 3 in a second position.

Referring to FIGS. 3-4, an activation assembly 200 houses the field of angularly adjustable drive roller modules 106 and forms a carryway in an activation region of the conveyor 100. Each drive roller module 106 comprises a roller carrier 206 with a roller opening and a drive roller 207 rotatably housed in the opening. The drive roller 207 freely spins within the opening on an axle. Depending on the orientation of the roller carriers 206, the drive rollers 207 selectively engage and activate the conveyor belt rollers 118 in a conveyor belt 102 riding above the activation assembly 200. The drive rollers 207 may change orientation by swiveling about their vertical axes. A conveyor may comprise multiple activation assemblies in various configurations to form a field 104 having a desired shape and number of driver roller modules.

The activation assembly 200 comprises an upper support plate 210 that includes openings 211 for seating the drive roller modules 106, which can pivot within the openings 211 to change their respective orientations. A lower support plate 230 mounts the upper support plate 210 with a space therebetween for a movable orientation plate 250. The movable orientation plate 250, which is sandwiched between the upper and lower support plates, engages the drive roller modules 106 to selectively cause the drive roller modules 106 to pivot about their vertical axes within the openings 211 to adjust their orientation. In certain select orientations, the drive rollers 207 selectively engage and activate the conveyor belt rollers 118. In other orientations, the drive rollers 207 are disengaged from the conveyor belt rollers 118.

The upper support plate 210 comprises a planar substrate 214 including camming surfaces 212 encircling the rim of each opening 211 to selectively raise and lower the drive roller modules 106 as they pivot about their vertical axes, as described below. The upper support plate 210 further includes downward-extending protrusions 213 for coupling the upper support plate 210 to the lower support plate 230. The lower support plate 230 comprises a planar substrate and includes holes 231 for receiving the downward-extending protrusions 213 to fix the upper support plate 210 and lower support plate 230 to each other, while allowing the movable orientation plate 250 to slide therebetween to allow adjustment of the drive rollers' orientation.

Figure 5:
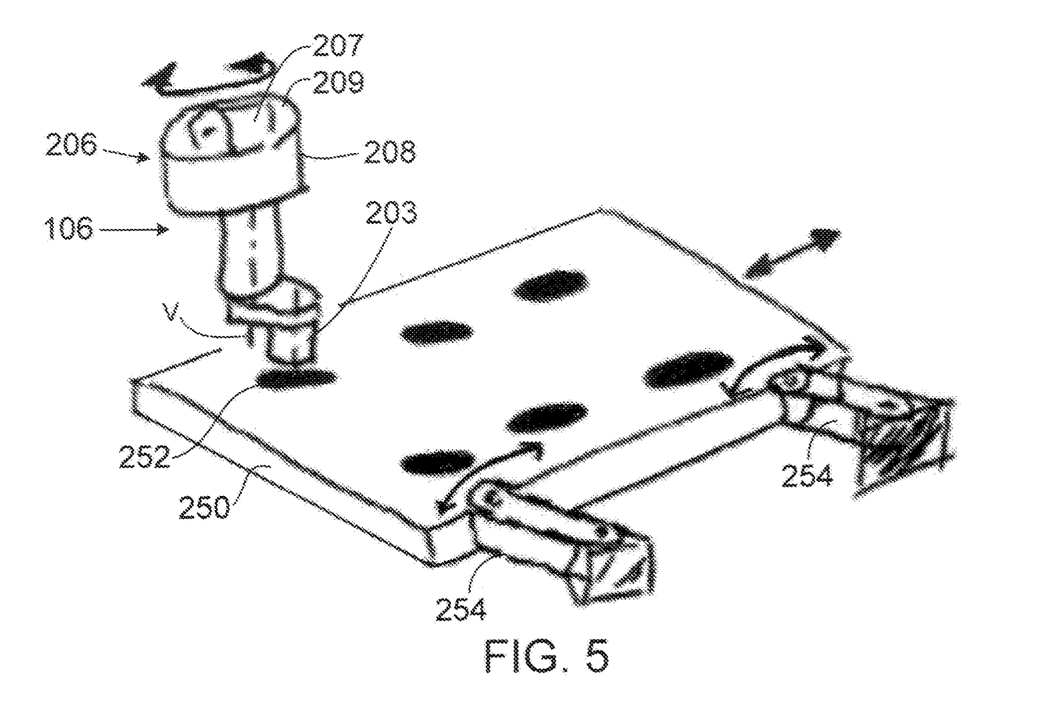
FIG. 5 is an isometric schematic of a movable orientation plate, actuator and drive roller assembly of an activation assembly according to an embodiment.

As shown in FIG. 5, the movable orientation plate 250 can be connected to a fixed frame by pivot links 254 to translate lateral movement to an arc-shaped path. When an actuator pushes or pulls the movable orientation plate 250, the pivot links 254 push or pull the movable orientation plate 250 through the arc-shaped path. The roller carriers 206 each include an offset pin 203 that is received in a corresponding pivot opening 252 in the movable translation plate 250, as described below. The offset pin 203 is offset from the vertical axis V of the roller carrier 206, and can spin within the pivot opening 252, so that movement of the movable orientation plate 250 through the arc-shaped path effects pivoting of the roller carriers 206 about their vertical axes. The arc-shaped path has a radius equal to the distance between the axis of the offset pin 203 and the vertical axis V of the roller carrier 206. The interface between the offset pin 203 and the movable orientation plate 250 both locates the movable orientation plate 250 relative to the upper support plate 210 and lower support plate 230 and fixes the angle of the roller carriers, making adjustments unnecessary as the components become automatically put into proper location.

Figure 6:
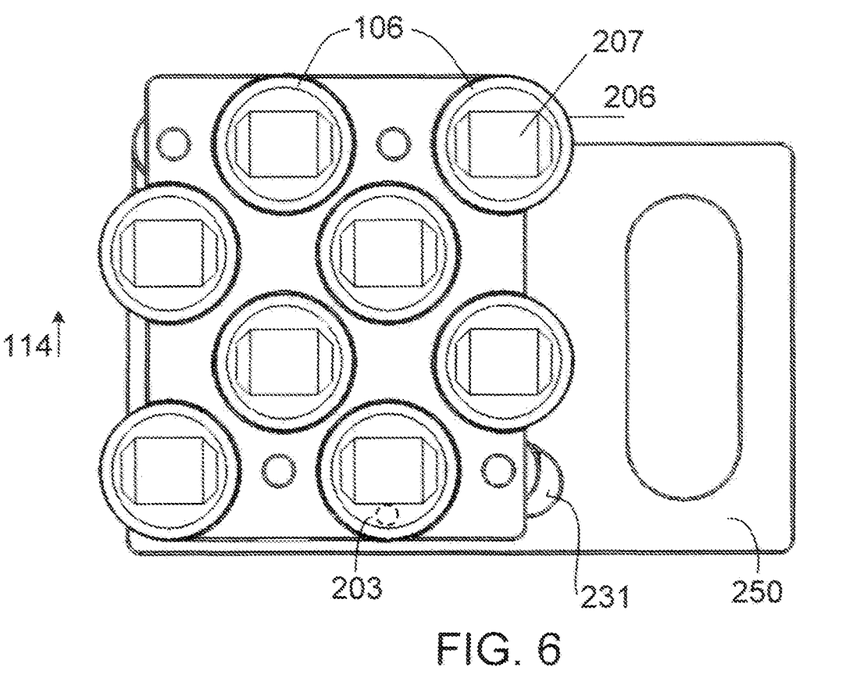
FIG. 6 is a top view of the activation assembly of FIG. 3 in the first position.
Figure 7:
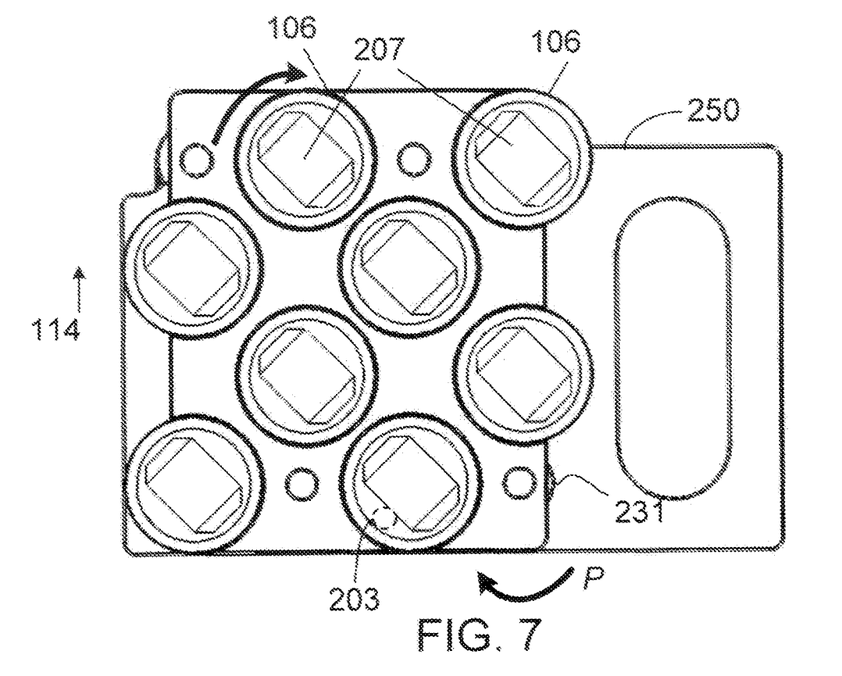
FIG. 7 is a top view of the activation assembly of FIG. 3 in a second position.

Referring to FIGS. 6 and 7, when the movable orientation plate 250 is in a first position, shown in FIG. 6, the drive rollers 207 are oriented in a non-activated position. In this position, the drive rollers axes are perpendicular to the direction of belt travel 114 so that the drive rollers 207 spin in the direction of belt travel 114. In the non-activated position, the drive rollers 207 are lowered and out of contact with the conveyor belt rollers 118. When an actuator pushes the orientation plate 250 along the arc-shaped path P, as shown in FIG. 7, the orientation plate pushes the offset pins 203 along the arc-shaped path, which causes the drive rollers 207 to swivel about their vertical axes and become angled relative to the direction of belt travel 114. In addition, the driver rollers 207 may raise into contact with the conveyor belt rollers in the engaged position. Pushing the movable orientation plate 250 in an opposite direction will cause the drive rollers 207 to swivel in an opposite direction relative to the direction of belt travel.

Figure 8:
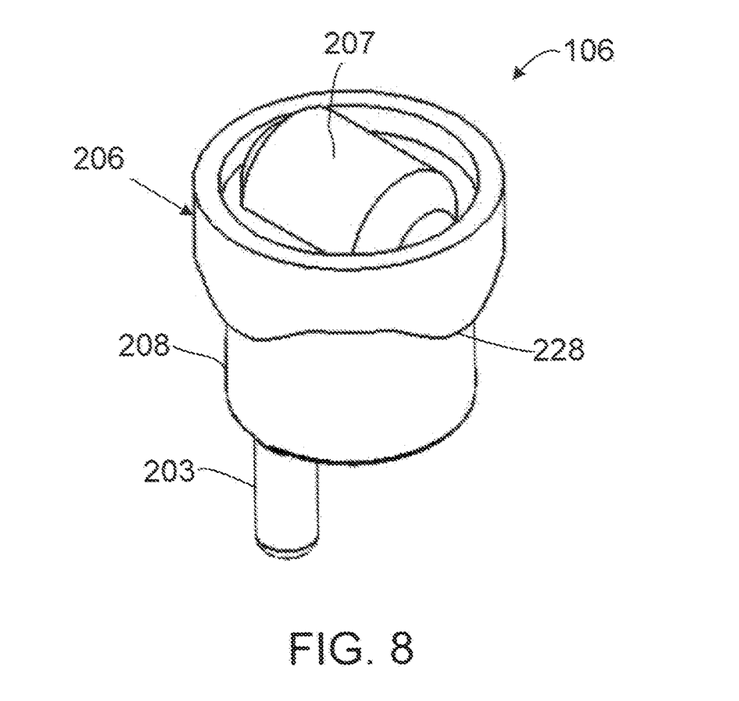
FIG. 8 is a detailed view of a portion of a drive roller assembly of an embodiment.

As shown in FIGS. 5 and 8, each roller carrier 206 includes a cylindrical housing 208 with an opening 209 for a drive roller 207. The drive roller 207 is rotatably mounted in the cylindrical housing 208 so that its top surface protrudes above the top of the cylindrical housing. The cylindrical housing 208 includes a downward-facing cam surface 228 forming a rim between an upper portion and a bottom of the cylindrical housing. The downward-facing cam surface 228 coacts with upwardly-facing cam surface 212 on the upper support plate 210 to selectively raise and lower the roller carrier 206 as it pivots about its vertical axis. The illustrative cam surfaces 212, 228, are lobed, with ramp sections, to effect vertical movement of the roller carrier 206 and drive roller 207 during pivoting about a vertical axis, but the invention is not so limited. The bottom of the cylindrical housing 208 is received in the opening 211 and constrained by the bottom of the opening 211. The offset pin 203 of the roller carrier 206 extends through an aperture in the bottom of the opening 211 and into a pivot opening 252 in the movable orientation plate 250. The movable orientation plate 250 moves the offset pins 203 along curved paths to pivot the drive rollers 207, which remain constrained in longitudinal and lateral position by the openings 211.

Figure 9:
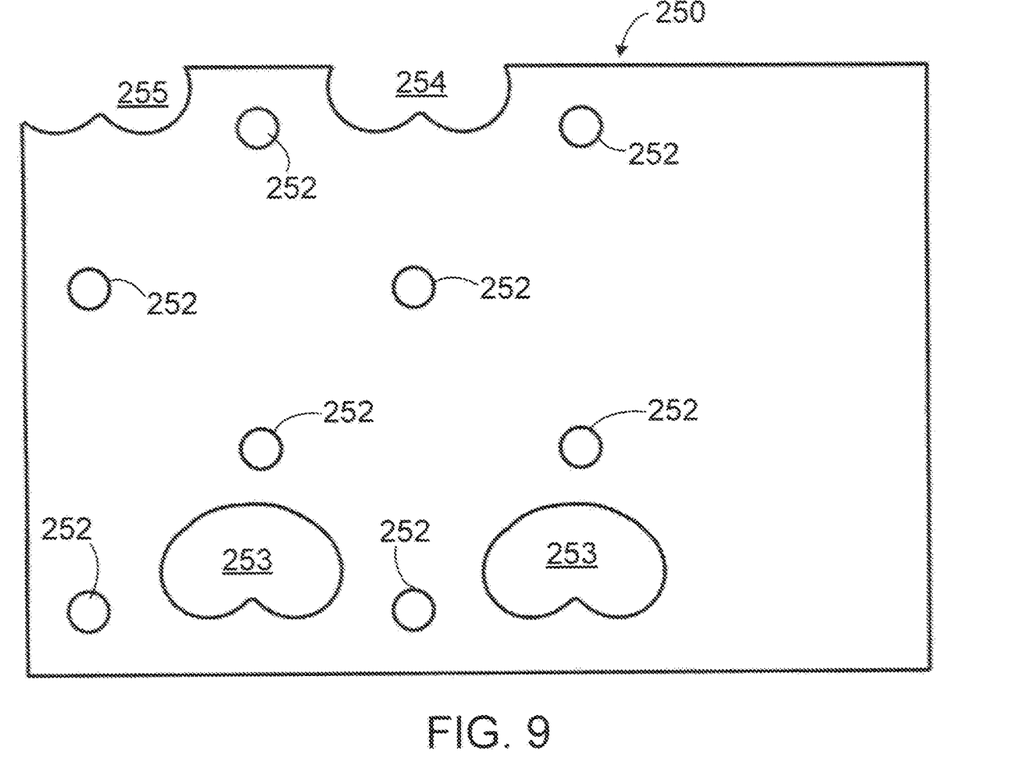
FIG. 9 is a top view of a movable orientation plate of the activation assembly of FIG. 3.

Referring to FIG. 9, each movable orientation plate 250 comprises a planar substrate 251 configured to fit and slide between the upper support plate 210 and lower support plate 230 while selectively pivoting the roller carriers 206. Pivot openings 252 are configured to receive the offset pins 203 of the roller carriers 206 and allow for pivoting of the offset pins therewithin. The pivot openings 252 constrain the lateral and longitudinal movement of the roller carriers 206 relative to the movable orientation plate 250 while allowing pivoting of the roller carriers 206 about their respective vertical axes. Clearance slots 253 allow the movable orientation plate 250 to move around the protrusions 213 connecting the upper support plate 210 and the lower support plate 230 when moving along the arc-shaped path. Clearance recesses 254, 255 in the top edge of the planar substrate 251 also accommodate protrusions 213. The clearance slots 253 and recesses 254, 255 are shaped to facilitate the arch-shaped path of the movable orientation plate 250 to effect rotation of the roller carriers 206.

Figure 10:
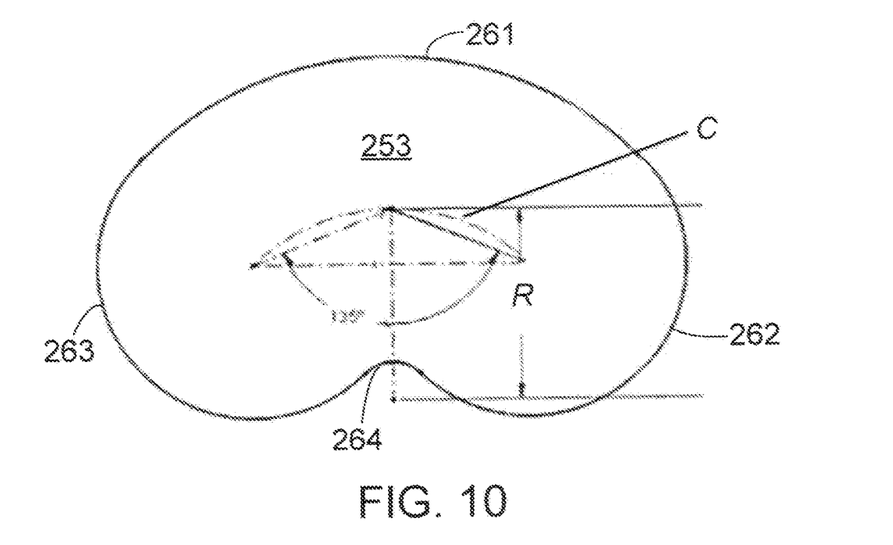
FIG. 10 is a detailed view of a clearance slot of the movable orientation plate of FIG. 9.

Referring to FIG. 10, the illustrative clearance recess 253 is a substantially arc-shaped slot having a circular center line C having a radius R that is substantially equal to or greater than the distance between the offset pin 203 and central vertical axis of a roller carrier 206. The arc-shaped slot comprises a top curve 261 forming a first boundary The arc-shaped slot 253 terminates in smaller curves 262, 263 that span about 180 degrees and are configured to accommodate the connecting protrusions 213. The smaller curves transition to an inflection point 264 in the middle of the recess. The illustrative inflection point 264 is rounded. The distance between the inflection point 264 and the apex of the top curve 261 is sufficient for passage of the connecting protrusion 213 as it travels through the slot during movement of the movable orientation plate 250.

Figure 11:
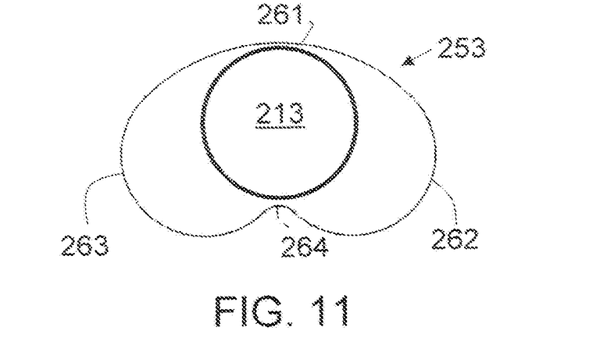
FIG. 11 shows a connecting protrusion of an upper support plate in the clearance slot of FIG. 10 when the movable orientation plate is in a first position.

As shown in FIG. 11, when the movable orientation plate is in the first position (shown in FIG. 6) which places the drive rollers 207 in the inactive, lowered position, the connecting protrusions 213 will be located in the middle of the clearance recess 253, between the top of the top curve and the inflection point 264.

Figure 12:
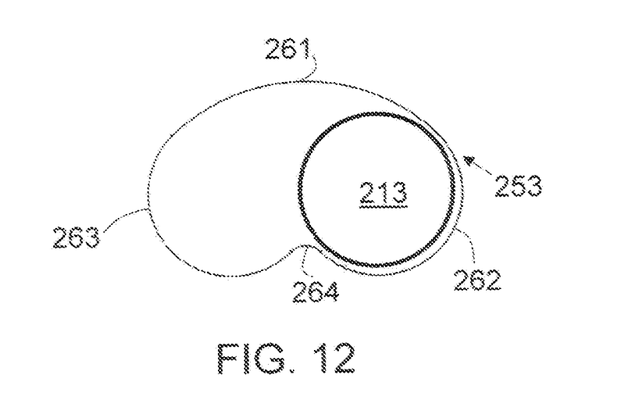
FIG. 12 shows the connecting protrusion and clearance slot of FIG. 11 in a second position.

When the movable orientation plate 250 moves to the second position (shown in FIG. 7) to swivel the drive rollers 207 towards a first side of the conveyor, the clearance recesses 253 allow the movable orientation plate 250 to clear the connecting protrusions 213 fixing the top support plate 210 to the lower support plate 230. In the second position, the connecting protrusions 213 extend through a region defined by the first smaller curve 262 of the clearance slot 253.

Figure 13:
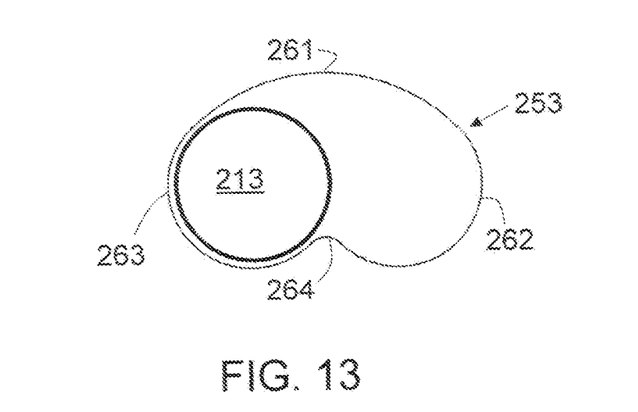
FIG. 13 shows the connecting protrusion and clearance slot of FIG. 11 in a third position.

When the movable orientation plate 250 arcs to the opposite end of the arc-shaped path to swivel the drive rollers 207 towards a second side of the conveyor, the connecting protrusions 213 extend through a region defined by the second smaller curve 263, as shown in FIG. 13.

The clearance slots 253 may have any suitable size, shape and configuration to allow movement of the movable orientation plate 250 to orient the drive rollers 207.

The use of a movable orientation plate that moves through an arc-shaped path to actuate drive rollers by interfacing with an offset pin facilitates accuracy, assembly, manufacture, and operation as well as reduces noise.

Other suitable means for selectively pivoting the roller carriers may be used.

While particular embodiments have been disclosed in detail in the foregoing description and drawings for purposes of example, it will be understood by those skilled in the art that variations and modifications thereof can be made without departing from the scope of the disclosure.

What is claimed is:

1. A drive roller assembly for selectively actuating conveyor belt rollers in a conveyor belt configured to divert objects atop the conveyor belt rollers as the conveyor belt advances along a carryway, the drive roller assembly comprising:
    a plurality of pivotable roller carriers, each roller carrier housing a freely rotatable drive roller that contacts the conveyor belt rollers from below the conveyor belt and having a pin extending downwards that is offset from a vertical axis of the roller carrier;
    an upper support plate including a planar portion and an array of openings for seating the pivotable roller carriers, each pin extending through the upper support plate;
    a lower support plate having a planar portion coupled to and spaced from the planar portion of the upper support plate; and
    a movable orientation plate sandwiched between the upper support plate and the lower support plate for engaging the pivotable roller carriers to change the orientation of the drive rollers with respect to the conveyor belt rollers, the movable orientation plate including pivot openings for receiving the pins;
    wherein the movable orientation plate moves through an arc-shaped path to pivot the pivotable roller carriers about their vertical axes.

2. The drive roller assembly of claim 1, wherein the openings in the upper support plate include camming surfaces encircling the rim of each opening, and the roller carriers include downward-facing cam surfaces that coact with the upper support plate camming surfaces to raise and lower the roller carrier as it pivots about its vertical axis.

3. The drive roller assembly of claim 1, wherein the upper support plate includes a plurality of downward-extending protrusions, and the lower support plate includes a plurality of holes for receiving the downward-extending protrusions to fix the upper support plate and to the lower support plate.

4. The drive roller assembly of claim 3, wherein the movable orientation plate includes a plurality of arc-shaped clearance slots for accommodating the downward-extending protrusions.

5. The drive roller assembly of claim 4, wherein the movable orientation plate further includes recesses in an upper edge for accommodating the downward-extending protrusions.

6. The drive roller assembly of claim 1, wherein the movable orientation plate is connected to a fixed frame by pivot links to translate lateral movement from an actuator to the arc-shaped path of the movable orientation plate.

7. A movable orientation plate for activating a drive roller in a drive roller assembly, comprising:
   a planar substrate;
   a plurality of pivot openings for receiving offset pins from a drive roller carrier;
   a plurality of arc-shaped clearance slots for allowing passage of a first set of protrusions connecting an upper support plate to a lower support plate of the drive roller assembly, and
   a plurality of pivot links for connecting the planar substrate to a fixed frame,
   wherein the movable orientation plate is configured to be sandwiched between the upper support plate and the lower support plate.

8. The movable orientation plate of claim 7, further comprising recesses in an upper edge of the planar substrate for accommodating a second set of protrusions connecting the upper support plate to the lower support plate.

9. The movable orientation plate of claim 7, wherein each arc-shaped clearance slot has a circular center line having a radius that is substantially equal to or greater than the distance between an offset pin and a central vertical axis of a roller carrier.

10. The movable orientation plate of claim 7, wherein each arc-shaped clearance slot comprises a top forming a first boundary, two smaller curves forming ends of the arc-shaped clearance slot and an inflection pint between the two smaller curves.

11. The movable orientation plate of claim 10, wherein the inflection point is rounded.

12. A movable orientation plate for activating a drive roller in a drive roller assembly, comprising:
   a planar substrate;
   a plurality of pivot openings for receiving offset pins from a drive roller carrier; and
   a plurality of arc-shaped clearance slots for allowing passage of a first set of protrusions connecting an upper support plate to a lower support plate of the drive roller assembly, each arc-shaped clearance slot having a circular center line having a radius that is substantially equal to or greater than the distance between an offset pin and a central vertical axis of a drive roller carrier,
   wherein the movable orientation plate is sandwiched between the upper support plate and the lower support plate.

13. The movable orientation plate of claim 12, further comprising recesses in an upper edge of the planar substrate for accommodating a second set of protrusions connecting the upper support plate to the lower support plate.

14. The movable orientation plate of claim 12, wherein each arc-shaped clearance slot comprises a top forming a first boundary, two smaller curves forming ends of the arc-shaped clearance slot and an inflection pint between the two smaller curves.

15. The movable orientation plate of claim 14, wherein the inflection point is rounded.

* * * * *